INVENTORS
Edward M. Florcyk.
Richard L. Rice.
Glen P. Woodbury.
BY Edward F. Dunne
ATTORNEY Jan. 14, 1941.  E. M. FLORCYK ET AL  2,228,304
MACHINE FOR MAKING WIRED BOX PARTS
Filed Jan. 19, 1939   6 Sheets-Sheet 4

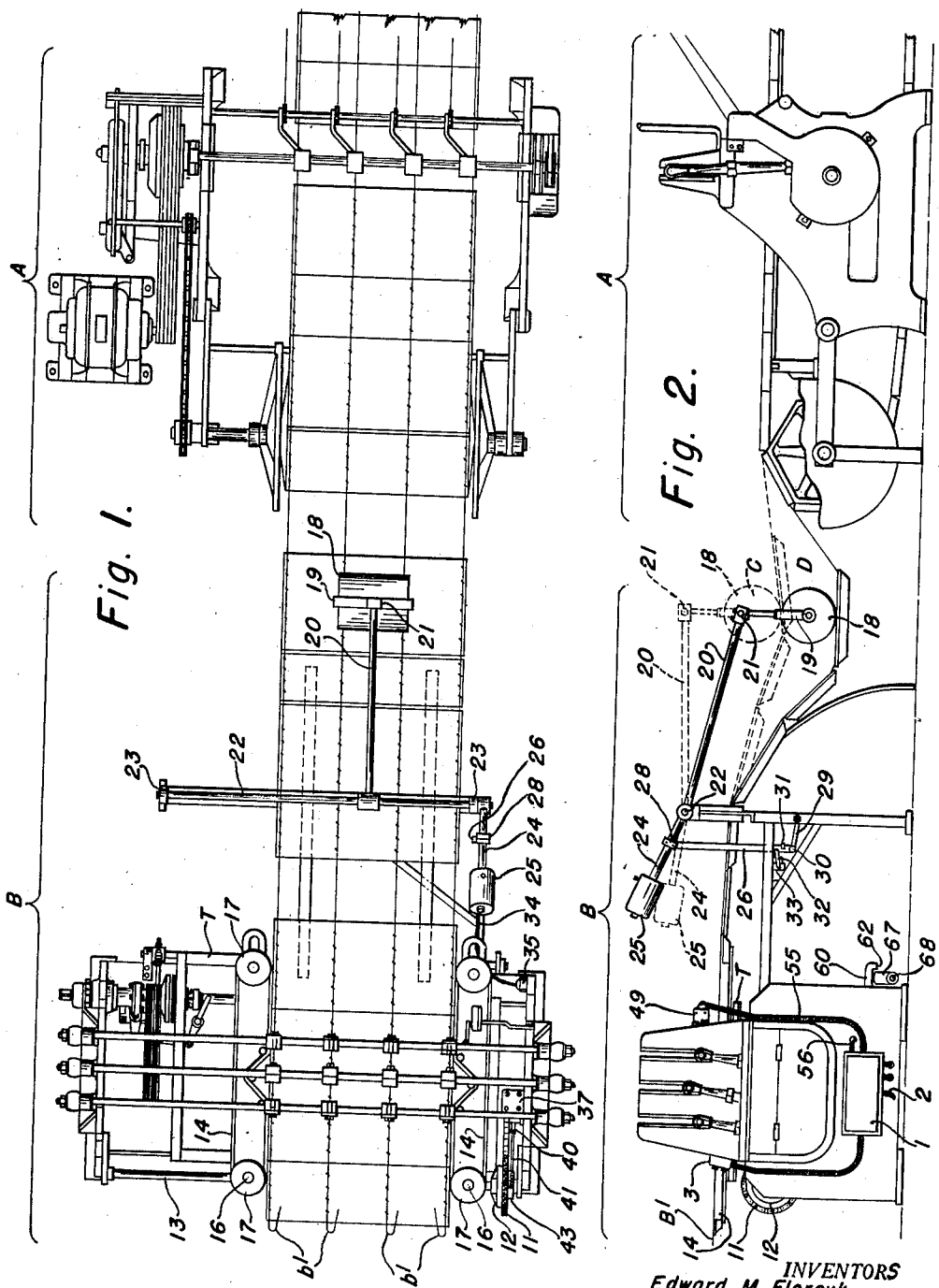

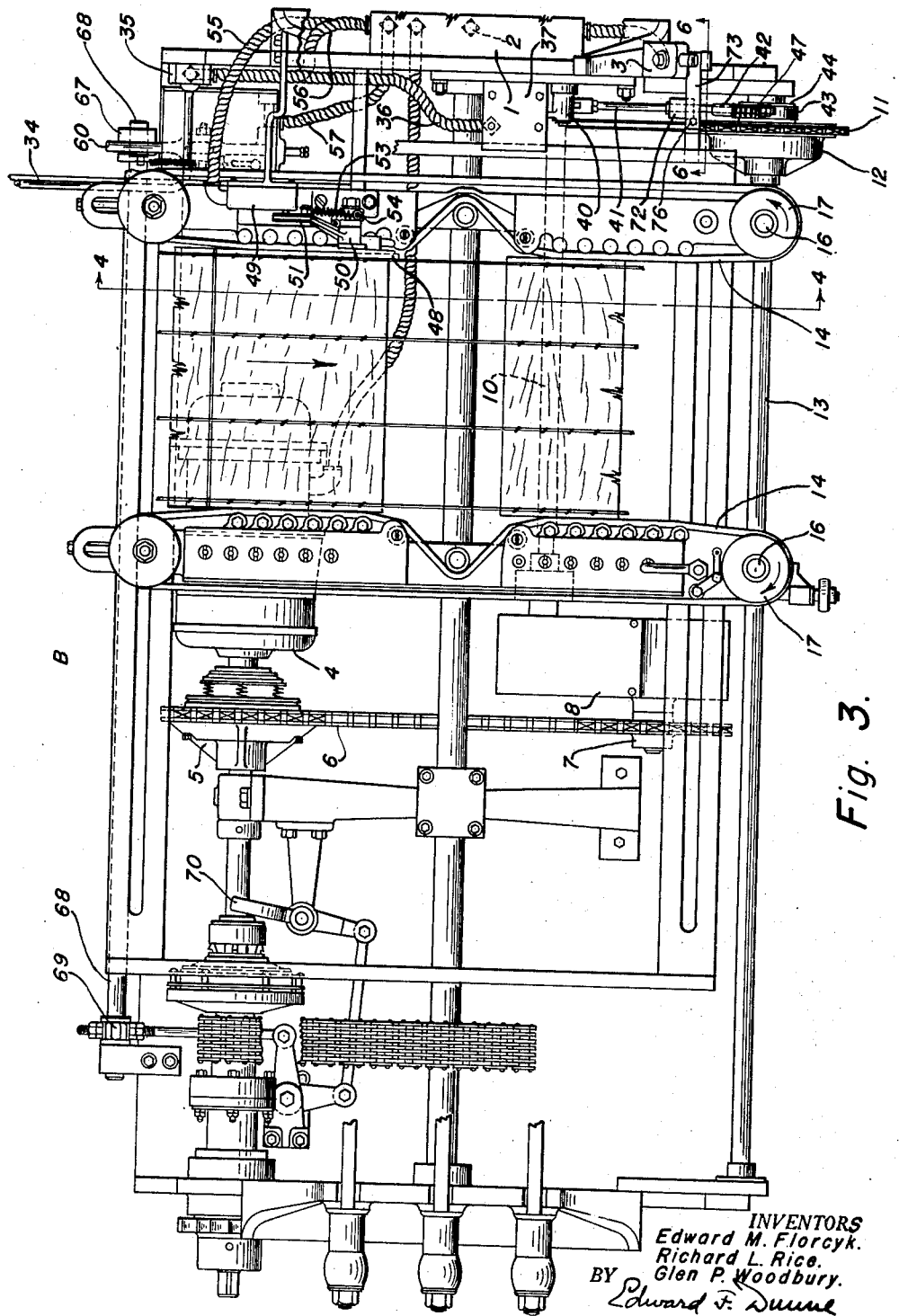

INVENTORS
Edward M. Florcyk.
Richard L. Rice.
Glen P. Woodbury.
BY Edward F. Dunne
ATTORNEY Jan. 14, 1941.　　　E. M. FLORCYK ET AL　　　2,228,304
MACHINE FOR MAKING WIRED BOX PARTS
Filed Jan. 19, 1939　　　6 Sheets-Sheet 5
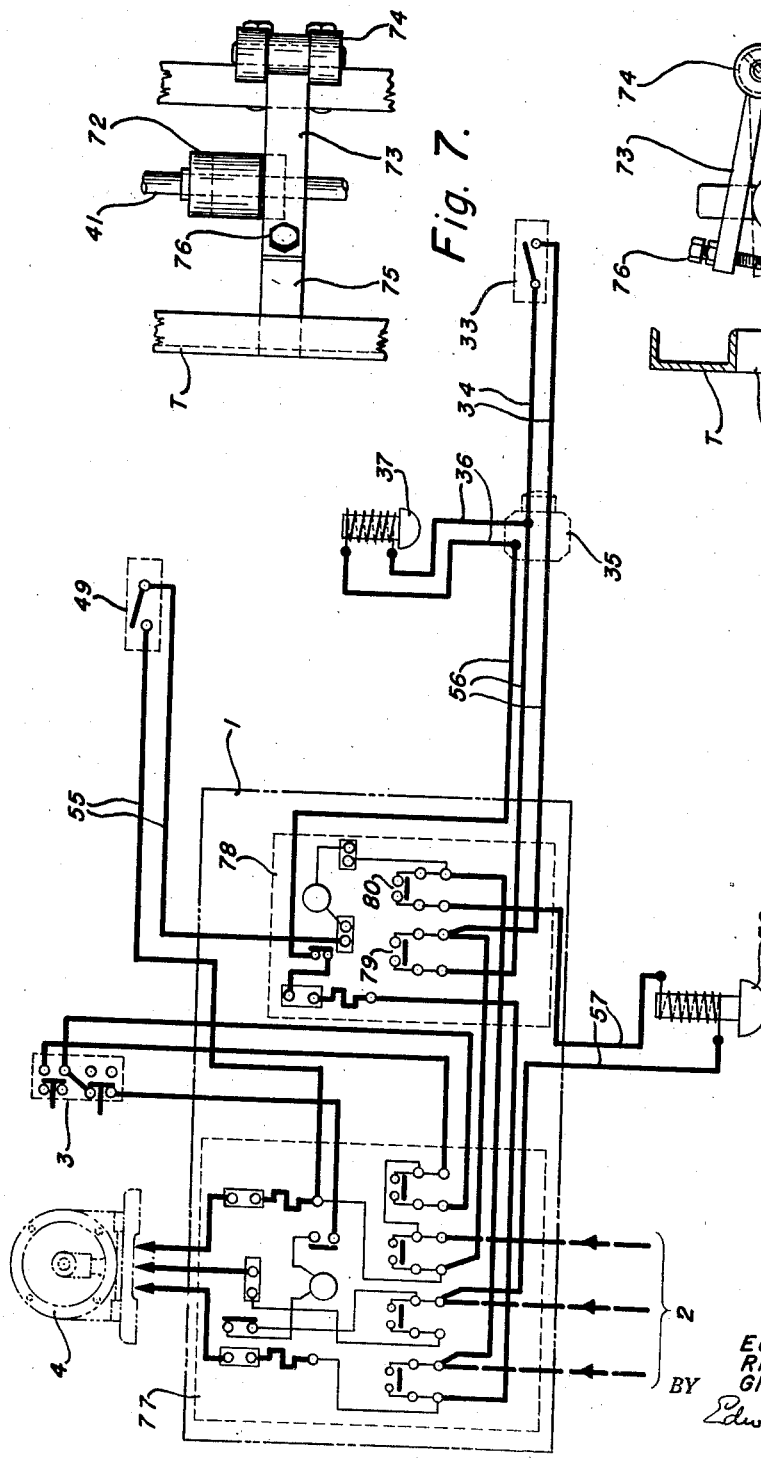
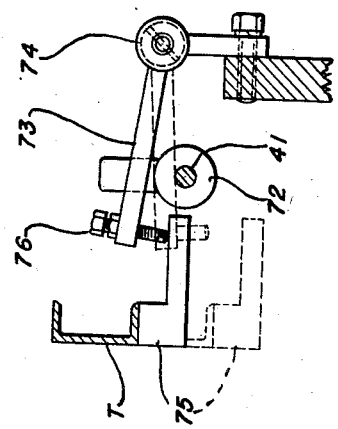
INVENTORS
Edward M. Florcyk.
Richard L. Rice.
Glen P. Woodbury.
BY Edward F. Dunne
ATTORNEY Jan. 14, 1941.  E. M. FLORCYK ET AL  2,228,304
MACHINE FOR MAKING WIRED BOX PARTS
Filed Jan. 19, 1939  6 Sheets-Sheet 6

INVENTORS
Edward M. Florcyk.
Richard L. Rice.
BY Glen P. Woodbury.
Edward F. Dunne
ATTORNEY Patented Jan. 14, 1941

2,228,304

UNITED STATES PATENT OFFICE 2,228,304

MACHINE FOR MAKING WIRED BOX PARTS

Edward M. Florcyk, Rockaway, Richard L. Rice, Newark, and Glen P. Woodbury, Rockaway, N. J., assignors to Stapling Machines Co., a corporation of Delaware Application January 19, 1939, Serial No. 251,744

13 Claims. (Cl. 140—93)

This invention relates to machines for equipping wired box parts with fasteners adapted to connect one box part with another box part, and particularly to the means for controlling the feed of the box parts and the operations of the fastener supplying instrumentalities.

It is an object of the invention to provide an automatic electrical control for a fastener supplying machine of the character described.

It is a further object of the invention to provide an automatic control for such a machine, which is dependable and accurate in its operations.

In the drawings:

Figure 1 is a top plan view of a fastener supplying machine embodying the invention, together with a portion of a box blank machine. This view shows the manner in which a succession of wire-connected box blanks are automatically fed from a box blank machine to and through a fastener supplying machine.

Fig. 2 is a side elevation of the same.

Fig. 3 is a top plan view, on a larger scale, of the fastener supplying machine, with certain parts omitted for clearness, showing the spaced relationship of two separate box blanks as they are fed through the machine. In this view, the forward edge of the incoming box blank is about to actuate the electrical control to cause a fastener supplying operation.

Fig. 6 is an enlarged view of a section taken on the line 6—6 of Fig. 3, showing a safety device that prevents any movement of the box part feeding mechanism during a fastener supplying operation.

Fig. 7 is a top plan view of the same.

Fig. 8 is a wiring diagram of the electrical control of the fastener supplying machine.

Figure 4:
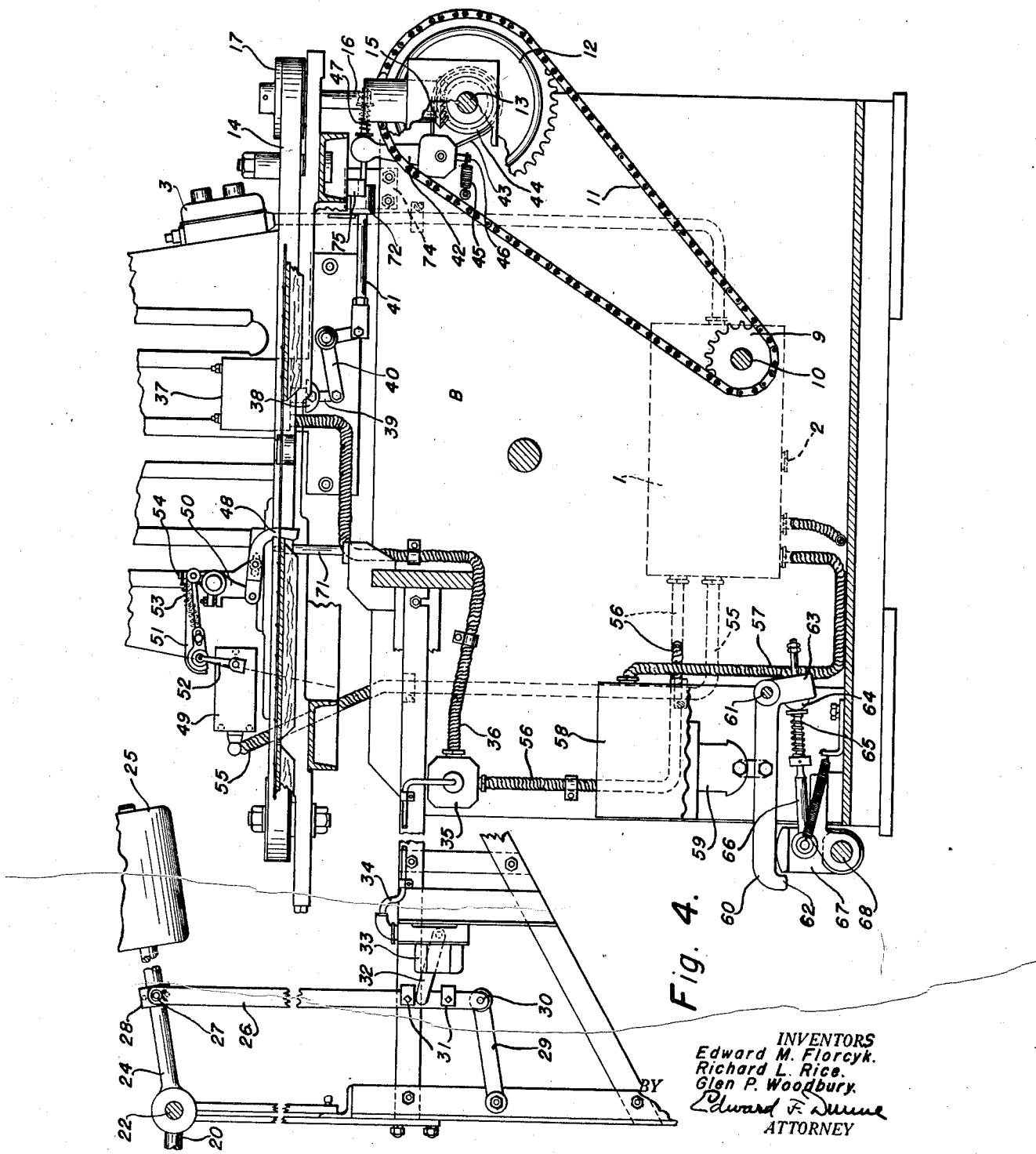
Fig. 4 is an enlarged side elevation taken on the line 4—4 of Fig. 3.

As conducive to a better understanding of this invention it should be noted that a machine of the general type herein disclosed is shown and described in the copending application of A. L. Rosenmund, Serial Number 134,789, filed April 3, 1937, and patented June 6, 1939, Patent 2,160,200, and that this invention is an improvement in the type of machine disclosed in said Rosenmund application.

In the machine of said Rosenmund application, wired box parts are fed automatically from a box blank machine to and through a fastener supplying machine, which severs the wires between box parts, bends the severed wire ends to form U-shaped bights or fasteners, and drives the ends of the wires into the box parts to perpetuate the bights. In said machine, mechanical means are provided to control the feed of the box parts and the operations of the bight forming instrumentalities in accordance with the passage of the box parts through the machine. While the mechanical control means of said Rosenmund machine operated successfully, it sometimes lacked a desired uniformity and accuracy of operation, due to the complexity and multiplicity of the operating parts. The present invention is intended to substitute for the complicated mechanical control means of the Rosenmund machine an electrical control means which assures a uniform, accurate control of the work feeding means and the bight forming operations to produce a more uniform and better box product.

Figs. 1 and 2 show the delivery end of a box blank machine, designated A, and a fastener supplying machine, designated B, together with a succession of box blanks being fed from machine A to and through machine B.

As shown and described in said Rosenmund application, the endless conveyor chains of the box blank machine A move continuously, while the endless feed belts of the machine B are at rest during a fastener supplying operation; therefore, the string of box blanks in the space between the two machines assumes various positions, as shown in full and dotted lines, respectively, in Fig. 2.

To correlate the continuous feed of machine A with the intermittent feed of machine B, a feed control for machine B is provided. Additional controls are provided to stop the feed of the feed belts and throw the fastener supplying mechanism into operation when a box part is in proper position to be operated upon by the bight-forming instrumentalities, and to cause the feed belts to resume feeding upon completion of a bight forming operation.

As heretofore stated, the above mentioned controls in said Rosenmund machine were mechanical.

The electrical controls of this application will now be described.

Referring to Figs. 2 and 8, the main supply of electric current comes to the machine B from a control box 1, through a connection 2. A push button switch 3 controls the flow of current to the circuits beyond the control box 1. When push button switch 3 is operated to close the circuit, a motor 4 and the circuits hereinafter described are energized through a magnetic line starter 77.

Figure 5:
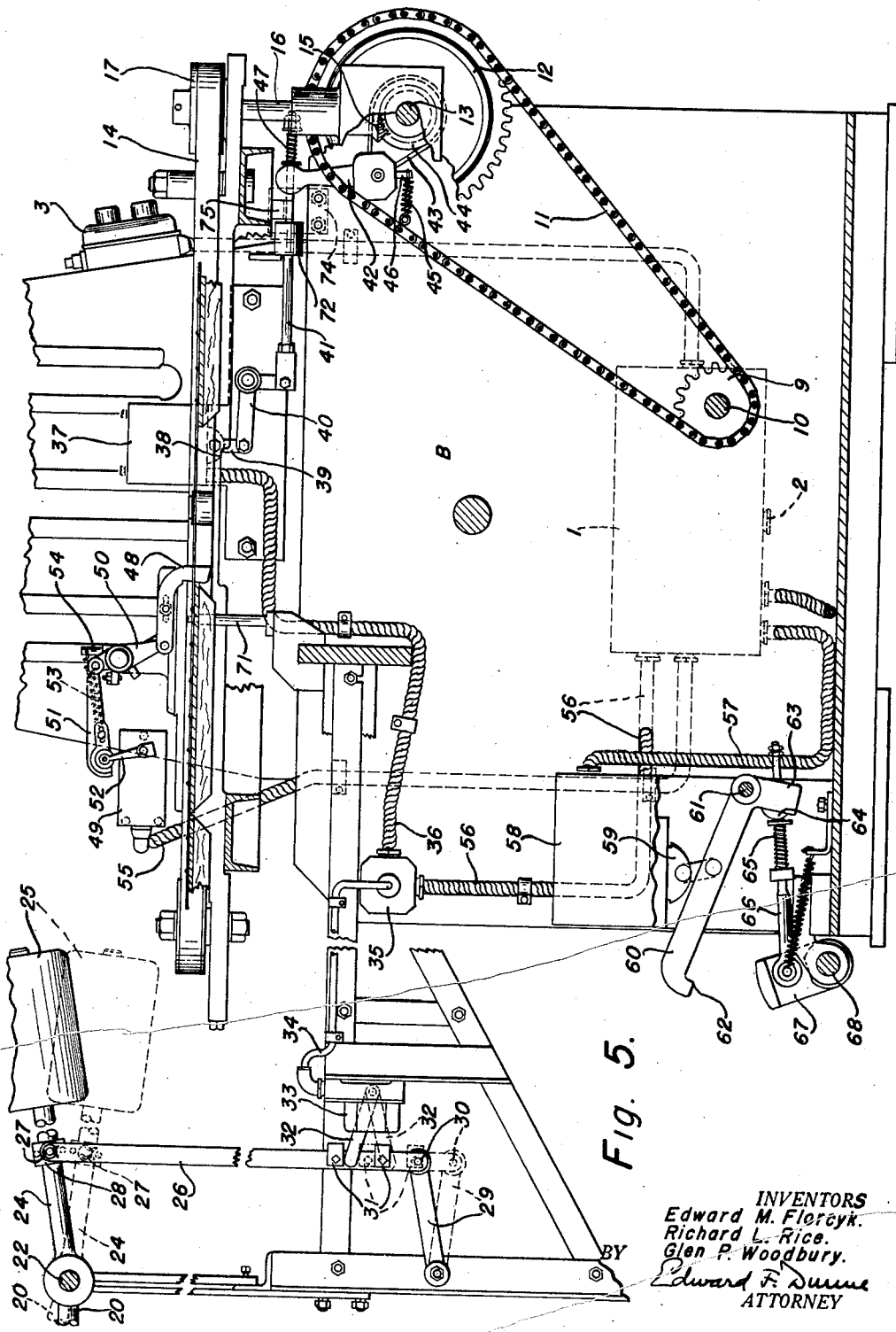
Fig. 5 is the same as Fig. 4, but showing the parts in the position occupied by them during a different phase in the cycle of operation.

As shown in Figs. 3 and 4, with motor 4 rotating, motion will be transmitted to a clutch sprocket 12 by means of a sprocket 5, a chain 6, and a sprocket 7, thence to gears in a gear box 8, and thence to a sprocket 9 on a shaft 10 and to a chain 11. Clutch sprocket 12 houses a clutching mechanism (hereinafter described in detail) which may be clutched or declutched to a drive shaft 13 at any point in its revolution. Feed belts 14, which feed the box parts through the machine, are driven by drive shaft 13, through bevel gears 15, shafts 16, and pulleys 17 on shafts 16. Thus, the belts 14 move only when drive shaft 13 is caused to rotate by the clutch mechanism in clutch sprocket 12. As shown in Figs. 4 and 5, the clutch mechanism housed in clutch sprocket 12 is actuated by a solenoid 37, either by applying or releasing a brake band 43 on a brake drum 44.

The starting and stopping of the belts 14 by solenoid 37 is controlled by the position of the string of box blanks in their travel from machine A to machine B. As shown in Figs. 1 and 2, a roller 18 rides upon the top surface of the string of box blanks at a suitable point between the delivery end of machine A and the receiving end of machine B. Roller 18 is rotatably mounted on a yoke 19, which is pivotally connected to an arm 20 at 21. The opposite end of arm 20 is adjustably secured on a rock shaft 22, which is journaled at each end in bearings 23.

Permanently secured to an angle on rock shaft 22 is an arm 24 carrying adjustably thereon a counterbalance 25 to work in conjunction with roller 18. Referring to Figs. 2 and 4 and particularly to Fig. 4, there is shown a downwardly extending member 26 pivotally mounted at 27 on a collar 28 adjustably secured on arm 24. Member 26 is pivotally secured at its lower extremity to a lever 29 at 30. The other end of lever 29 is loosely attached to a supporting frame. Near the lower extremity of member 26 are adjustably secured a pair of blocks 31 conveniently spaced to receive between them a switch lever 32, which is attached to the operating mechanism of a switch 33.

When the box blanks, with the roller 18 resting thereon, assume the full line position D (Fig. 2), the blocks 31 on member 26 actuate switch 33, which has an interlocking arrangement with a circuit from a switch 49, as will be more fully described hereinafter. The circuit, through wires 34, box 35, and wires in cable 36 is now broken, and solenoid 37 deenergized (Fig. 4).

When solenoid 37 is deenergized, the rotating clutch sprocket 12 is clutched to shaft 13, as presently described, to cause a feed movement of feed belts 14.

When the box blanks and roller 18 assume the dotted line position C (Fig. 2), the blocks 31 on member 26 (Fig. 5) actuate switch 33 to close the circuit through wires 34, box 35, and wires in cable 36, thus energizing solenoid 37, causing disengagement of the clutch mechanism and stopping the motion of feed belts 14 and also the feeding of box blanks.

The mechanism for clutching sprocket 12 to shaft 13 will now be described.

Figure 9:
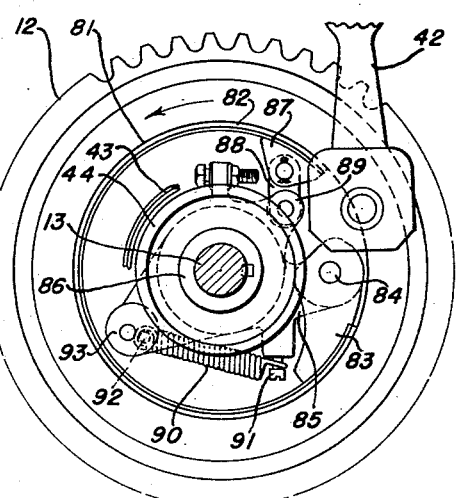
Fig. 9 is an enlarged front view of the clutch mechanism that controls the movements of the feed belts. This view is taken from the opposite side of the machine as shown in Fig. 4, and shows the parts in clutching engagement.
Figure 12:
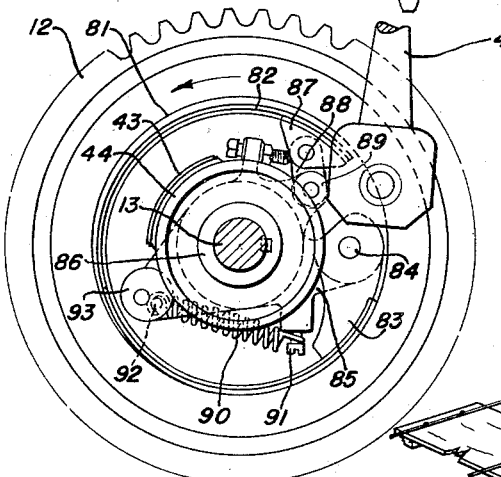
Fig. 12 is a perspective view of portions of two wire-connected box blanks as they are fed into the machine of this invention.

As shown in Fig. 9, there is keyed to shaft 13 a member 85. Pivotally connected to the member 85 at 84 is a lug 83, to which is secured one end of a clutch band 82, which, when expanded into contact with a drum surface 81 of sprocket 12, causes shaft 13 to rotate with sprocket 12 in the direction of the arrow in Fig. 9. Clutch band 82 is expanded through the action of a spring 90, one end of which is attached to a projection 91 on member 85 and the other end of which is attached to a stud 92 in a projection 93 on a rocker member 89. Rocker member 89 is freely mounted on a hub 86 of member 85 and through a toggle link 88 is connected to a lug 87 secured to the other end of clutch band 82. Spring 90 normally holds rocker member 89 and toggle link 88 in the position shown in Fig. 9, and when rocker member 89 and toggle link 88 are in this position the rear end of clutch band 82 is forced into contact with drum surface 81. This frictional engagement between the rear end of the band 82 and the revolving drum surface 81 causes clutching engagement between the two throughout substantially the entire length of the clutch band and causes rotation of shaft 13.

Figure 11:
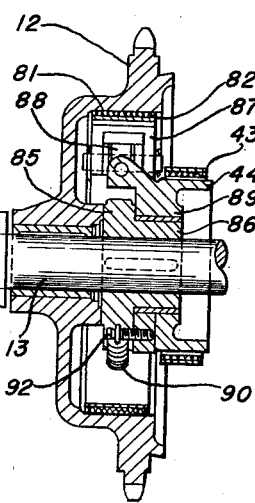
Fig. 11 is the same as Fig. 9, but shows the parts in non-clutching engagement.

To break the toggle against the action of spring 90 and release the clutching engagement between the band 82 and the drum surface 81, a brake band 43 is applied to a brake drum 44 carried by rocker member 89. When brake band 43 is applied to brake drum 44, movement of rocker member 89 is arrested. This breaks the toggle 88 and draws clutch band 82 away from drum surface 81, as shown in Fig. 11.

Brake band 43 is operated by a suitable toggle (not shown) carried by a rocker lever 42. Lever 42 is normally held in the position shown in Figs. 4 and 9 by a spring 45, one end of which is attached to a stud 46 on the lower extremity of lever 42 and the other end of which is attached to the machine frame. When in this position, brake band 43 is released, thus permitting spring 90 to clutch sprocket 12 to shaft 13.

Figure 10:
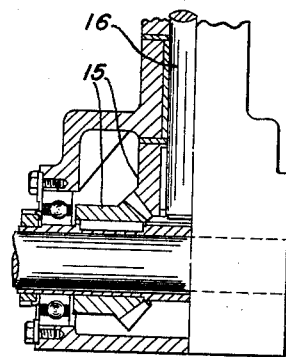
Fig. 10 is a longitudinal sectional view of the same.

Lever 42 is moved against the action of spring 45, shown in Figs. 5 and 10, by a buffer 47 carried by a rod 41, which passes through a bore in the upper end of lever 42 and is connected to a bell crank 40, which, in turn, is connected by a link 39 to a solenoid member 38 of solenoid 37.

When solenoid 37 is energized, member 38 is drawn upward and, through the linkage described, moves lever 42 against the action of spring 45 to apply brake band 43 on brake drum 44 to disconnect the clutch.

When solenoid 37 is deenergized, spring 45 moves lever 42 to release brake band 43 and permit spring 90 to clutch sprocket 12 to shaft 13.

With the roller 18 in the full line position D (Fig. 2), the belts 14 continue to feed the box blanks until the leading end of a box blank arrives at a predetermined point in the machine B. Referring to Figs. 3 and 4, the forward edge of the incoming box blank contacts a trigger 48, moving it in a line parallel with the box blank travel. The movement of trigger 48 actuates switch 49 through a rock lever 50, a connecting link 51, and a switch lever 52, which is secured to the mechanism in switch 49. To return this linkage to its initial position there is provided a spring 53, with one end secured to connecting link 51 and the other end fastened to a stud 54. By actuating switch 49 as shown in Fig. 5, the circuit is closed through cable 55, which energizes a magnetic contactor 78 located in control box I and thus closes contacts 79 and 80 of magnetic contactor 78. Two operations are thus performed automatically and instantly. The closing of contacts 79 completes the circuit through cable 56 to box 35 and through cable 36 to energize solenoid 37, thus declutching the feed mechanism by attraction of linkage, as hereinbefore mentioned, to apply brake band 43 on clutch drum 44.

The closing of contacts 80 completes the circuit through cable 57 to energize a solenoid 58, thus causing the attraction of a member 59 and raising a latch 60, by means of a link connection, from the position shown in Fig. 4 to that shown in Fig. 5. Latch 60, loosely mounted on a shaft 61, is provided with a safety hook 62 at one end and a downwardly projecting portion 63 at the other. As latch 60 is raised, a lug 64 on projection 63 is forced against a buffer arrangement 65 secured on a reduced portion of a rod 66 which extends through a bore in projection 63. The rod 66 imparts a rocking motion to a shaft 68 by means of its connection to a casting 67, which is keyed to shaft 68. The shaft 68 at its other end has keyed thereon a lever 69, connected to proper linkage, which causes the main clutch of one cycle design to become engaged by the movement imparted to clutch yoke 70. As fully described in the aforementioned application of Rosenmund, when the main clutch is engaged the table T lowers to present the binding wires and box blanks to the mechanism provided to perform a fastener supplying operation thereon.

When table T is lowered, a projection 71, fixed to the machine frame, contacts the under surface of trigger 48 and causes it to be raised, thus removing it from the path of travel of the box blank being operated upon when it resumes its travel. With the return of the table T to its initial position the trigger 48 rests upon the top surface of the box blank as it moves through the machine B, until the succeeding gap occurs between box blanks, and dropping therein, positions the forward edge of the incoming box blank.

In order to prevent any movement of the box blanks during a fastener supplying operation there is provided a safety mechanism, shown generally in Figs. 3, 4, and 5, and in detail in Figs. 6 and 7. With the solenoid 37 energized (Fig. 5) causing the attraction of member 38 and rod 41, a block 72, which is adjustably mounted on rod 41 at a predetermined point, moves from the path of a latch 73, loosely mounted in a bracket 74 which is secured to the main frame. As shown in broken lines (Fig. 6) and in full lines (Fig. 7), the latch 73 rests upon the rod 41 adjacent to the block 72 and keeps the brake band 43 applied on clutch drum 44 until table T rises. To return the latch 73 to its initial position there is provided a bracket 75 secured to the under surface of table T and projecting toward and a sufficient distance below latch 73. As table T rises, the bracket 75 contacts an adjustable screw 76 projecting through latch 73, thereby raising latch 73 to the position shown in full lines in Fig. 6, and permits brake band 43 to be released from clutch drum 44 when the solenoid 37 is deenergized to resume the feeding of box blanks.

Figure 13:
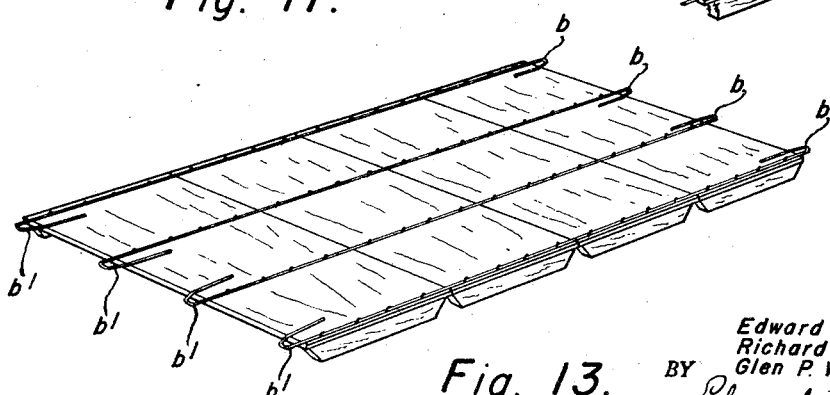
Fig. 13 is a perspective view of a completed box blank.

In Fig. 13 is shown one product of the machine, namely, a box blank having the wire ends provided with U-shaped bights, designated b and b'. When the blank is folded into box form, the bights b are passed through the bights b' and bent down against the box side to close the box. To insure a tight closure it is necessary that the bights extend a proper predetermined distance from the end edges of the blank. If they extend too far or not far enough, a poor box closure will result.

Among other advantages, the electrical control for the work feed and for the bight forming instrumentalities insures a uniform and accurate location of each bight in proper relation to the box part edge.

It will be understood that the invention is not to be limited to the specific embodiment herein shown for illustration.

It will be understood further that the word "bight" as used in the specification and the claims is not to be limited to the particular U-shaped bight shown in Fig. 13. The bight or fastener may be substantially in loop form or in some other form suitably adapted to connect one box part with another box part or to serve as part of a connection between one box part and another box part.

We claim:

1. A machine for equipping a box part with fastening means adapted to connect the box part with another box part, comprising instrumentalities operable upon a flexible binder secured to a box part to form and perpetuate a bight on said binder, and electrically controlled means to feed the box part to said instrumentalities.

2. A machine for equipping a box part with fastening means adapted to connect the box part with another box part, comprising instrumentalities operable upon a flexible binder secured to a box part to form and perpetuate a bight on said binder, and electrically controlled means to operate said instrumentalities.

3. A machine for equipping a box part with fastening means adapted to connect the box part with another box part, comprising instrumentalities operable upon a flexible binder secured to a box part to form and perpetuate a bight on said binder, and electrically controlled means to feed the box part to said instrumentalities and to operate said instrumentalities.

4. In a machine having instrumentalities for forming a loop or bight on a flexible binder secured to a box part and having mechanism for feeding the box part to said instrumentalities, electrical control means to cause an operation of said instrumentalities when the box part is in correct position to be operated upon.

5. In a machine having instrumentalities for forming a loop or bight on a flexible binder secured to a box part and having mechanism for feeding the box part to said instrumentalities, electrical control means to interrupt the feed of the box part and throw said instrumentalities into operation.

6. In a machine having instrumentalities for forming a loop or bight on a flexible binder secured to a box part and having mechanism for feeding the box part to said instrumentalities, electrical control means to interrupt the feed of the box part, to throw said instrumentalities into operation while the box part is at rest, and to cause the feeding mechanism to resume its feed of the box part after the operation of said instrumentalities.

7. In a machine having instrumentalities for forming loops or bights on a flexible binder secured to a succession of box parts and having mechanism for feeding the box parts to said instrumentalities, electrical control means to cause an operation of said instrumentalities when the box part is in correct position to be operated upon.

8. In a machine having instrumentalities for forming loops or bights on a flexible binder secured to a succession of box parts and having mechanism for feeding the box parts to said instrumentalities, electrical control means to interrupt the feed of the box part and throw said instrumentalities into operation.

9. In a machine having instrumentalities for forming loops or bights on a flexible binder secured to a succession of box parts and having mechanism for feeding the box parts to said instrumentalities, electrical control means to interrupt the feed of the box part, to throw said instrumentalities into operation while the box part is at rest, and to cause the feeding mechanism to resume its feed of the box part after the operation of said instrumentalities.

10. In a machine having instrumentalities for forming a loop or bight on a flexible binder secured to a box part and having mechanism for feeding the box part to said instrumentalities, electrical means controlled by the box part in its passage through the machine to cause an operation of said instrumentalities when the box part is in correct position to be operated upon.

11. In a machine having instrumentalities for forming a loop or bight on a flexible binder secured to a box part and having mechanism for feeding the box part to said instrumentalities, electrical means controlled by the box part in its passage through the machine to interrupt the feed of the box part and throw said instrumentalities into operation.

12. In a machine having instrumentalities for forming loops or bights on a flexible binder secured to a succession of box parts and having mechanism for feeding the box parts to said instrumentalities, electrical means controlled in accordance with the passage of the box parts through the machine to cause an operation of said instrumentalities when the box part is in correct position to be operated upon.

13. In a machine having instrumentalities for forming loops or bights on a flexible binder secured to a succession of box parts and having mechanism for feeding the box parts to said instrumentalities, electrical means controlled in accordance with the passage of the box parts through the machine to interrupt the feed of the box parts and throw said instrumentalities into operation.

EDWARD M. FLORCYK.
RICHARD L. RICE.
GLEN P. WOODBURY.